US010862832B1

(12) United States Patent
Harris

(10) Patent No.: US 10,862,832 B1
(45) Date of Patent: Dec. 8, 2020

(54) COMPUTING SYSTEM AND METHOD FOR AUTOMATICALLY REVERSING AN ACTION INDICATED BY AN ELECTRONIC MESSAGE

(71) Applicant: McKesson Corporation, Irving, TX (US)

(72) Inventor: Patrick Harris, Brookhaven, GA (US)

(73) Assignee: MCKESSON CORPORATION, Irving, TX (US)

( * ) Notice: Subject to any disclaimer, the term of this patent is extended or adjusted under 35 U.S.C. 154(b) by 321 days.

(21) Appl. No.: 16/043,401

(22) Filed: Jul. 24, 2018

(51) Int. Cl.
G06Q 30/02 (2012.01)
H04L 12/58 (2006.01)
G06F 16/335 (2019.01)
H04L 29/06 (2006.01)

(52) U.S. Cl.
CPC .......... *H04L 51/046* (2013.01); *G06F 16/337* (2019.01); *G06Q 30/0283* (2013.01); *G06Q 30/02* (2013.01); *H04L 51/12* (2013.01); *H04L 63/1483* (2013.01)

(58) Field of Classification Search
CPC ..... H04L 63/1483; H04L 51/12; H04L 51/28; H04L 61/1547; G06F 16/337; G06Q 30/02
USPC .......................... 709/206, 220, 224, 226, 228
See application file for complete search history.

(56) References Cited

U.S. PATENT DOCUMENTS

| 9,026,507 | B2* | 5/2015 | Shraim | H04L 63/1425 707/694 |
| 9,356,947 | B2* | 5/2016 | Shraim | H04L 63/1441 |
| 10,628,797 | B2* | 4/2020 | Shraim | H04L 63/1441 |
| 2007/0108053 | A1* | 5/2007 | Cramer | G01N 27/419 204/432 |
| 2007/0194352 | A1* | 8/2007 | Han | H01L 27/14603 257/233 |
| 2007/0294765 | A1* | 12/2007 | Rihn | G06F 21/56 726/22 |
| 2007/0299915 | A1* | 12/2007 | Shraim | H04L 63/1491 709/206 |
| 2009/0064330 | A1* | 3/2009 | Shraim | H04L 63/1425 726/22 |
| 2009/0100099 | A1* | 4/2009 | Buckwalter | H04L 51/28 |
| 2015/0235177 | A1* | 8/2015 | Shraim | H04L 51/12 726/26 |

* cited by examiner

Primary Examiner — Khanh Q Dinh
(74) Attorney, Agent, or Firm — Alston & Bird LLP

(57) ABSTRACT

A computing device, method and computer program product are provided to automatically reverse an action indicated by an electronic message. In relation to a method, an electronic message is parsed to separately identify a plurality of fields of the electronic message providing different types of information. The method constructs a response to the electronic message that reverses the action indicated by the electronic message and transmits the response to the electronic message to a request processor that provided the electronic message. The method constructs an alternative message that provides an alternative action to the action indicated by the electronic message and transmits the alternative message to a source. In response to the alternative message, the method receives a subsequent request from the source. If the alternative action is to be taken, the method processes the subsequent request in a different manner than the request that generated the electronic message.

20 Claims, 4 Drawing Sheets

COMPUTING SYSTEM AND METHOD FOR AUTOMATICALLY REVERSING AN ACTION INDICATED BY AN ELECTRONIC MESSAGE

TECHNOLOGICAL FIELD

A computing device, method and computer program product are provided in order to automatically reverse an action indicated by an electronic message and, more particularly, to automatically reverse an action indicated by an electronic message in order to permit consideration of an alternative action.

BACKGROUND

Messages are exchanged between different parties in various different contexts. For example, a first party may issue a request and a second party may analyze the request and, in turn, issue a response. Based upon the response, the first party may then cause a subsequent action to be taken. While widely utilized, the exchange of messages including requests and subsequent responses consumes substantial network resources including network bandwidth in order to transmit the various messages. Additionally, processing resources of the first and second sources are consumed in order to construct or analyze the various messages. In at least some situations, the messages between first and second parties are not exchanged directly between the first and second parties, but propagate through one or more intermediary parties. Thus, the exchange of messages by the first and second parties not only consume processing resources of the first and second parties, but, in some instances, processing resources of the one or more intermediary parties.

Based upon the response to a request, an action may sometimes be taken by or caused to be taken by the first party. However, in other instances, the first party may elect to take no action based upon the response to the request. In these instances in which no action is taken or caused to be taken by the first party, the exchange of messages generally makes the entire roundtrip between the first and second parties, thereby consuming substantial network and processing resources, even though no action is eventually taken based thereupon.

In some instances, an alternative action may be preferable to the action that is triggered by the response to a request. However, the specific sequence of operations that are performed to exchange a request and a corresponding response may not be configured to permit alternative actions to be identified and considered. Instead, only the action that is associated with the particular request is performed even though some other action may be more desirable. Thus, the first party may cause a less desirable action to be performed based upon the response to the request since the first party may be unaware of the availability of an alternative action. In these instances, substantial network and processing resources may be consumed by the exchange of messages with the action that is subsequently performed being less desirable than other alternatives.

BRIEF SUMMARY

A computing device, method and computer program product are provided in accordance with an example embodiment in order to increase the efficiency with which messages are exchanged, thereby conserving network and processing resources associated with the exchange of messages. In this regard, a computing device, method and computer program product are provided in accordance with an example embodiment in order to automatically reverse an action indicated by an electronic message. By automatically reversing an action, the number of messages that are constructed, transmitted and received may be reduced. Moreover, the action indicated by an electronic message may be reversed because an alternative action that is more preferable may have been identified such that the computing device, method and computer program product of an example embodiment may facilitate the performance of actions that are more preferable, even in instances in which the initial action that is identified is one that is less preferable.

In accordance with an example embodiment, a computing device is provided that is configured to automatically reverse an action indicated by an electronic message. The computing device includes a communication interface configured to receive and transmit electronic messages. The computing device also includes processing circuitry configured, for a respective electronic message, to parse the electronic message to separately identify a plurality of fields of the electronic message providing different types of information. The processing circuitry is also configured to construct a response to the electronic message that reverses the action indicated by the electronic message. The processor is further configured to construct an alternative message that provides an alternative action to the action indicated by the electronic message. In an instance in which a subsequent request indicating that the alternative action be taken is received, the processing circuitry is configured to process the subsequent request in a different manner than a request that generated the electronic message. In this example embodiment, the communication interface is configured to receive the electronic message, to transmit the response to the electronic message to a request processor that provided the electronic message, to transmit the alternative message to a source of the request and to receive the subsequent request from the source. In an example embodiment, the processing circuitry is configured to automatically construct the response to the electronic message that reverses the action indicated by the electronic message and to automatically cause the communication interface to transmit the response to the electronic message to the request processor without input from the source.

The communication interface of an example embodiment is further configured to receive the request that generated the electronic message. The computing device of this example embodiment also includes at least one database configured to store the request. The processing circuitry of this example embodiment is further configured to compare the subsequent request to the request stored by the at least one database that generated the electronic message in order to determine whether the request and the subsequent request correspond. In an instance in which the request and the subsequent request are determined to correspond, the processing circuitry is configured to cause the subsequent request to be directed to the request processor and to cause a second electronic message received from the request processor in response to the subsequent request to be provided to the source without reversal of the action indicated by the second electronic message.

The processing circuitry of an example embodiment is further configured to determine the alternative action based upon the action indicated by the electronic message. In this example embodiment, the processing circuitry is configured to parse the electronic message to identify the field that indicates a cost of a product or service. The processing circuitry of this example embodiment is further configured to determine the alternative action by determining an alternative cost of the product or service based upon the cost of the product or service identified by the electronic message.

In another example embodiment, a method is provided for automatically reversing an action indicated by an electronic message. The method includes receiving a plurality of electronic messages. For a respective electronic message, the method includes parsing the electronic message to separately identify a plurality of fields of the electronic message providing different types of information. The method also includes constructing a response to the electronic message that reverses the action indicated by the electronic message and transmitting the response to the electronic message to a request processor that provided the electronic message. The method further includes constructing an alternative message that provides an alternative action to the action indicated by the electronic message and transmitting the alternative message to a source. In response to transmission of the alternative message, the method includes receiving a subsequent request from the source. In an instance in which the subsequent request indicates that the alternative action be taken, the method includes processing the subsequent request in a different manner than the request that generated the electronic message. In an example embodiment, the response to the electronic message that reverses the action indicated by the electronic message is automatically constructed and the response to the electronic message is automatically transmitted to the request processor without input from the source.

The method of an example embodiment further includes receiving the request that generated the electronic message and storing the request in at least one database. In this example embodiment, the method also includes comparing the subsequent request to the request stored by the at least one database that generated the electronic message in order to determine whether the request and the subsequent request correspond. In an instance in which the request and the subsequent request are determined to correspond, the method of this example embodiment also includes transmitting the subsequent request to the request processor and transmitting a second electronic message received from the request processor in response to the subsequent request to the source without reversal of the action indicated by the second electronic message.

The method of an example embodiment also includes determining the alternative action based upon the action indicated by the electronic message. In this example embodiment, the method parses the electronic message by parsing the electronic message to identify the field that indicates the cost of a product or service. The method of this example embodiment also includes determining the alternative action by determining an alternative cost for the product or service based upon the cost of the product or service identified by the electronic message.

In a further example embodiment, a computer program product is provided for automatically reversing an action indicated by an electronic message. The computer program product includes a non-transitory computer readable medium having program code stored thereon with the program code including program code instructions configured, upon execution, to receive a plurality of electronic messages. For a respective electronic message, the program code also includes program code instructions configured, upon execution, to parse the electronic message to separately identify a plurality of fields of the electronic message providing different types of information. The program code further includes program code instructions configured, upon execution, to construct a response to the electronic message that reverses the action indicated by the electronic message and to cause the response to the electronic message to be transmitted to a request processor that provided the electronic message. The program code also includes program code instructions configured, upon execution, to construct an alternative message that provides an alternative action to the action indicated by the electronic message and to cause the alternative message to be transmitted to a source. In response to transmission of the alternative message, the program code includes program code instructions configured, upon execution, to receive a subsequent request from the source. In an instance in which the subsequent request indicates that the alternative action be taken, the program code further includes program code instructions configured, upon execution, to process the subsequent request in a different manner than the request that generated the electronic message.

The program code of an example embodiment also includes program code instructions configured to receive the request that generated the electronic message and to cause the request to be stored in at least one database. The program code of this example embodiment also includes program code instructions configured to compare the subsequent request to the request stored by the at least one database that generated the electronic message in order to determine whether the request and the subsequent request correspond. In an instance in which the request and the subsequent request are determined to correspond, the program code further includes program code instructions configured to cause the subsequent request to be transmitted to the request processor and to cause a second electronic message received from the request processor in response to the subsequent request to be provided to the source without reversal of the action indicated by the second electronic message.

The program code of an example embodiment also includes program code instructions configured to determine the alternative action based upon the action indicated by the electronic message. In this example embodiment, the program code instructions configured to parse the electronic message include program code instructions configured to parse the electronic message to identify the field that indicates the cost of a product or service. The program code of this example embodiment also includes program code instructions configured to determine the alternative action by determining an alternative cost to the product or service based upon the cost of the product or service identified by the electronic message.

BRIEF DESCRIPTION OF THE DRAWINGS

Figure 1:
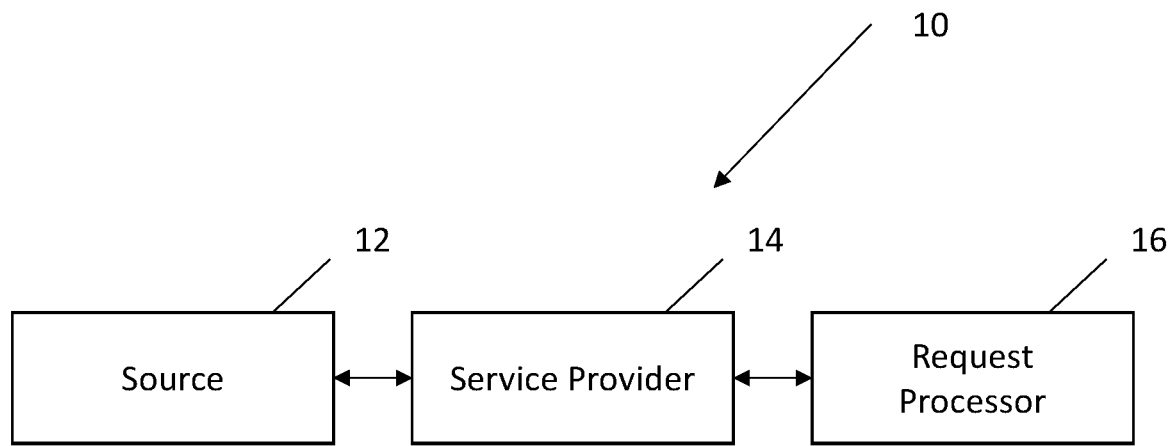
Figure 2:
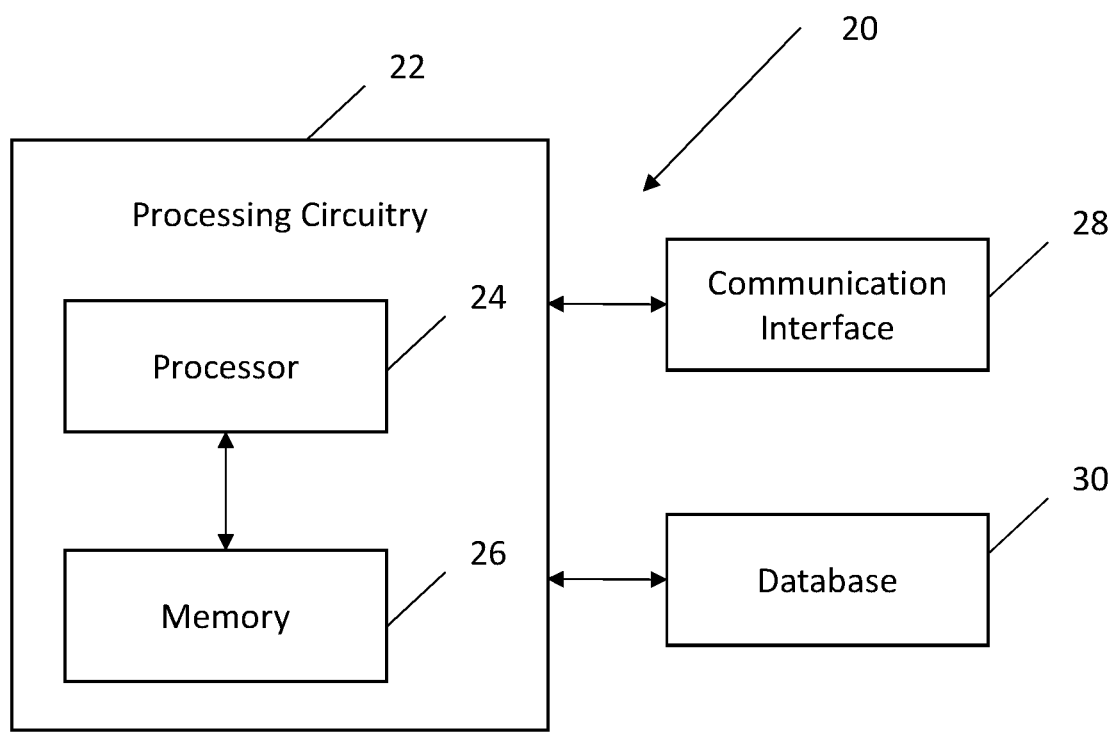
Figure 3:
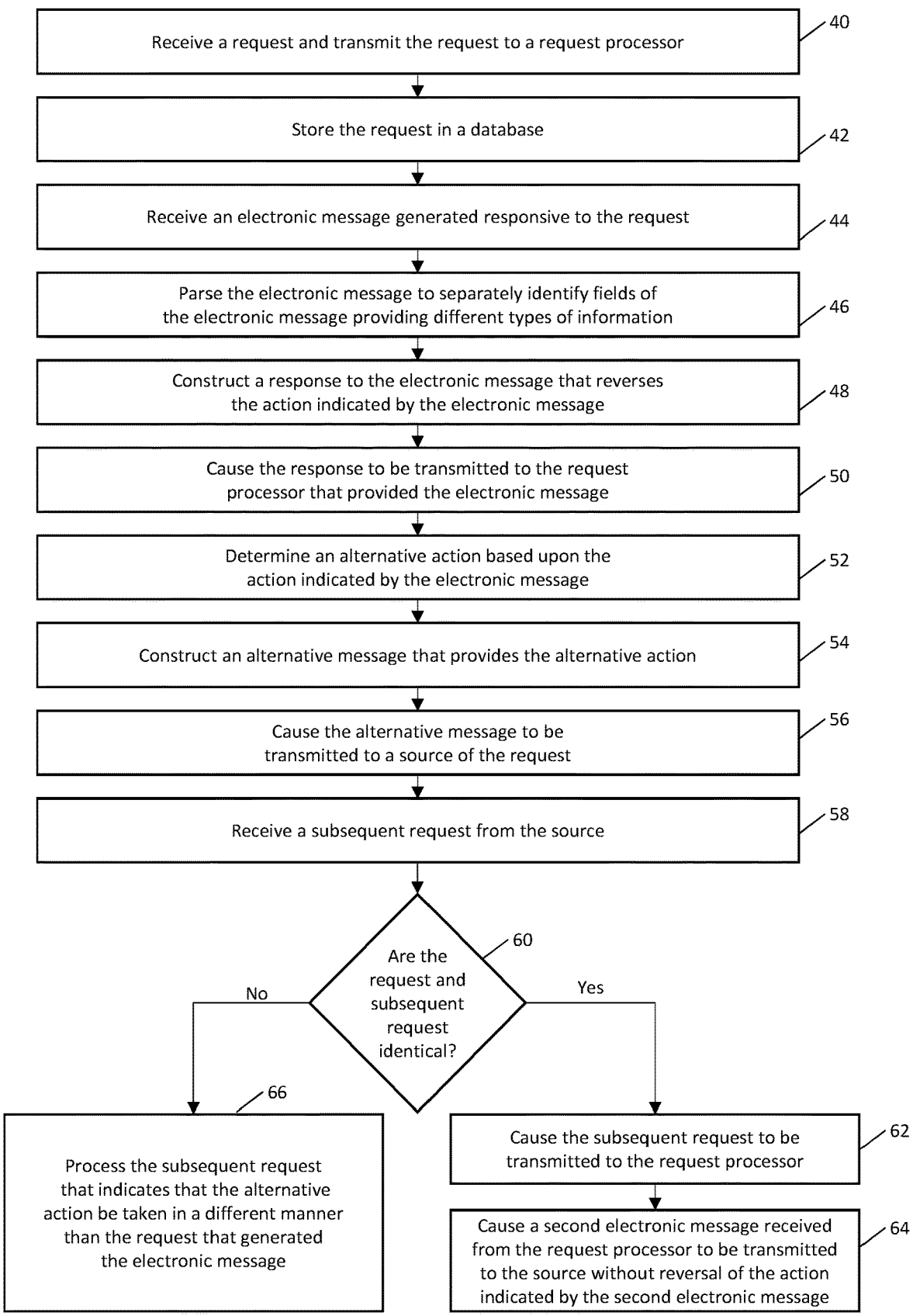
Figure 4:
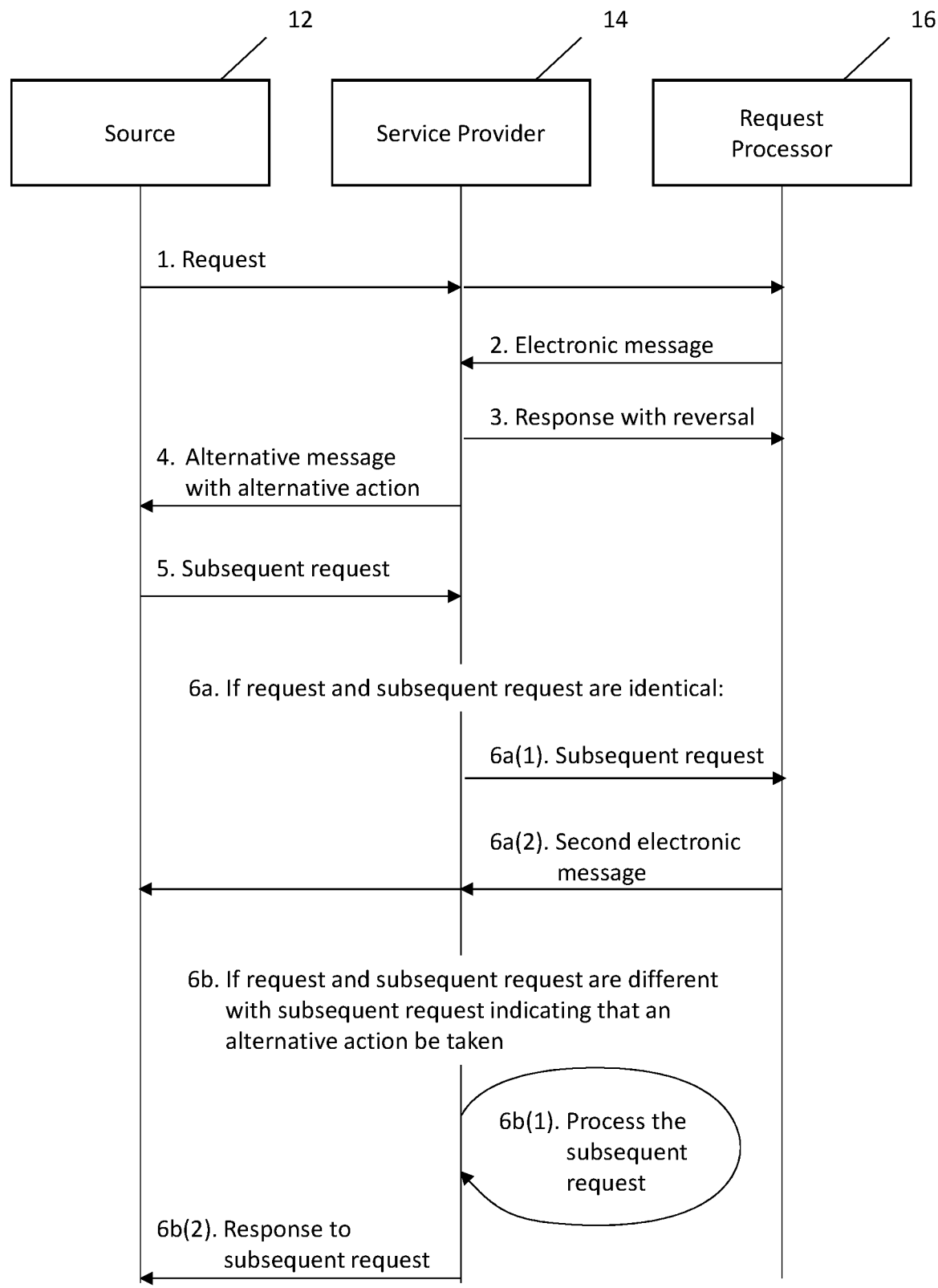
Figure 5:
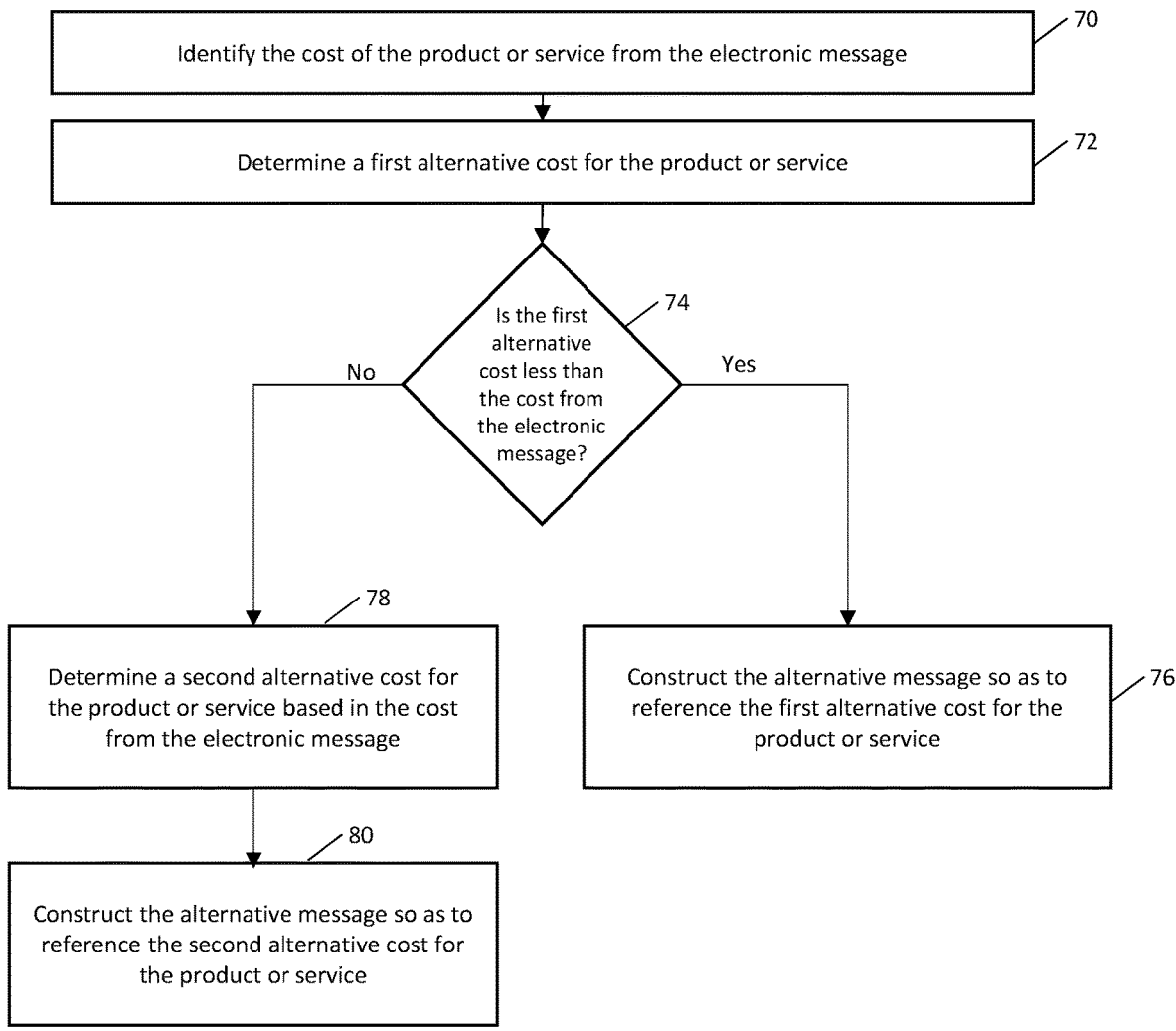

Having thus described certain embodiments of the invention in general terms, reference will now be made to the accompanying drawings, which are not necessarily drawn to scale, and wherein:

FIG. 1 is a diagram of a system configured to exchange electronic messages and to provide for the automatic reversal of an action indicated by an electronic message in accordance with an example embodiment of the present invention;

FIG. 2 is a block diagram of a computing device that may be specifically configured in accordance with an example embodiment to the present invention;

FIG. 3 is a flowchart illustrating the operations performed, such as a switch, e.g., a router, of the service provider of FIG. 1 that embodies the computing device of FIG. 2, in order to automatically reverse an action indicated by an electronic message in accordance with an example embodiment of the present invention;

FIG. 4 is a signal flow diagram of the messages exchanged by the source, the service provider and the request processor in accordance with an example embodiment of the present invention; and FIG. 5 is a flowchart illustrating the operations performed, such as the switch, e.g., the router of the service provider of FIG. 1 that embodies the computing device of FIG. 2, in order to determine an alternative cost in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A computing device, method and computer program product are provided in order to process electronic messages exchanged between a source and a request processor and to automatically reverse an action indicated by an electronic message from the request processor in some situations. By automatically reversing an action indicated by an electronic message from the request processor without relaying that electronic message to the source and without seeking instructions or input from the source, the computing device, method and computer program product of an example embodiment conserve network resources by eliminating the network resources otherwise consumed by the transmission of the electronic message to the source. Further, the computing device, method and computer program product of an example embodiment conserve processing resources, such as processing resources of the source, which otherwise would be consumed with the receipt, storage and processing of an electronic message that was to be reversed. By automatically reversing an action indicated by an electronic message from a request processor, the computing device, method and computer program product of an example embodiment also permit an alternative action to be identified and taken in a more timely manner.

A computing device, method and computer program product of an example embodiment may be implemented in a variety of systems, one of which is depicted in FIG. 1. As show in FIG. 1, a system 10 includes a source 12 configured, among other functions, to issue a request directed to a request processor 16. The system of FIG. 1 also includes one or more intermediary devices in communication with the source and the request processor and positioned therebetween from a communication standpoint. In the example embodiment depicted in FIG. 1, the system include a service provider 14 that communicates both with the source and the request processor. For example, the service provider receives a request from the source and transmits the request to the request processor. Once the request processor has processed the request, the request processor may transmit an electronic message directed to the source. However, the service provider of an example embodiment receives the electronic message from the request processor and, in at least some instances, automatically reverses the action indicated by the electronic message. In this regard, the automatic reversal of the action indicated by the electronic message occurs without input from the source or from another user of the system. As described below, the service provider may then communicate with the source in order to identify an alternative action, that is, an alternative to the action previously indicated by the electronic message from the request processor that has been reversed, that may be subsequently be requested by the source. As noted above, the automatic reversal of the action indicated by the electronic message from the request processor avoids additional transmission and processing of the electronic message and, as such, conserves network and processing resources and permits consideration of an alternative action in a more timely manner.

Although the computing device, method and computer program product may be employed in various applications, the computing device, method and computer program product of example embodiments are employed in conjunction with electronic messages seeking to invoke an action that may be reversed in certain circumstances. For example, the electronic messages may be communicated and processed in conjunction with telecommunication applications, content delivery and provisioning and healthcare applications, such as in conjunction with the submission and evaluation of prescription and/or medical claims, such as a prescription claim and/or a medical claim submitted by a pharmacy management system, and the provision of feedback regarding reimbursement of the pharmacy by a claims payor, e.g., an insurance company or the like, to name but a few.

The service provider 14 may be configured in various manners, but, in one embodiment, the service provider is embodied by a switch, such as a router, that includes a computing device 20 configured to parse an electronic message and to determine whether to the action proposed by the request processor 16 is to be reversed and an alternative action should, instead, be proposed. The computing device may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally, or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the source 12 and the request processor 16, such as one or more input/output (I/O) interfaces. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store data received from one or more other entities and/or information regarding different types of messages and/or portions of different types of messages as described below.

The operations performed by the computing device 20 embodied by the service provider 14 are depicted in accordance with an example embodiment in FIG. 3. As shown in block 40 of FIG. 3, the computing device of an example embodiment, such as the processing circuitry 22, the processor 24, the communication interface 28 or the like, is configured to receive a request from a source 12 and to transmit the request to a request processor 16. See also the Request identified as the first signal in the signal flow diagram of FIG. 4. As shown in block 42 of FIG. 3, the computing device includes means, such as the processing circuitry, the processor, the database 30 or the like, for storing the request received from the source in the at least one database. Although different types of requests may be received depending upon the application, the request may be an electronic healthcare message, such as a prescription claim request, medical claim request, predetermination of benefits request or the like, generated by a source, such as a pharmacy management system or a prescriber of medication or medical services, and directed, via the service provider, to a request processor 16 for processing and adjudication. In this embodiment, the electronic healthcare message typically includes information that identifies the patient, the medication, product, or service being requested, the healthcare provider (either the prescriber, pharmacy or both), and the benefit plan, e.g., prescription discount program, insurer, or government-funded payor for the patient.

As an example of a source 12, a pharmacy management system may be operated by a pharmacy in order to track the fulfillment of the various prescriptions and to submit prescription claims for reimbursement, requests for the predetermination of prescription benefits or the like via the service provider 14 to various request processors 16, such as claims processors, in order to obtain an analysis of the prescription claim or other request submitted by the pharmacy management system and to identify, for example, the patient's out of pocket costs, typically in real time or near real time. In the context of a predetermination of prescription benefits request, the claims processor responds with an indication as to whether or not the prescription claim will be reimbursed and, if so, to what extent and the service provider, in turn, provides this information to the pharmacy management system. In light of the performance of an increasing number of medical services by a pharmacy or a medical clinic housed by a pharmacy, a pharmacy management system of an example embodiment may also be configured to submit medical claims for reimbursement, requests for the predetermination of medical benefits or the like. In an instance in which the service provider returns a response regarding the reimbursement expected for a particular prescription or medical service, a pharmacy management system may direct fulfillment of the prescription or delivery of the medical service and/or direct communication between a pharmacist or other provider and a patient regarding the cost of the prescription or medical service that is not reimbursable and that must be borne by the patient. Although described herein in conjunction with a pharmacy management system, certain prescribers or other sources may also similarly communicate with the service provider, such as in conjunction with the submission and adjudication of a prescription claim request, medical claims request, predetermination of benefits request or the like. As such, the subsequent discussion applies equally to electronic messages submitted by various types of sources including pharmacy management systems and other prescribers.

The request includes a plurality of fields, each of which provides a different type of information. Although different types of requests may include different fields, the request of one example embodiment includes the following fields:

Purchase Plan Identifier—Payor ID/Routing Information
  BIN Number (i.e. Banking Identification Number); BIN Number and Processor Control Number (PCN); BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender that designates a destination of the request Purchaser Information
Name (e.g. Purchaser Last Name, Purchaser First Name, etc.)
Date of Birth of Purchaser
Gender of Purchaser
Purchaser Address (e.g. Street Address, Zip Code, etc.)
Purchaser Contact Information (e.g. purchaser telephone number, email address, etc.)
Purchaser ID or other identifier (e.g., driver's license number, social security number, Health Insurance Claim Number (HICN), etc.)
Purchase Plan Information
Cardholder Name (e.g. Cardholder First Name, Cardholder Last Name)
Cardholder ID and/or other identifier (e.g. person code)
Group ID and/or Group Information Transaction Type
Transaction Type Code (e.g., product purchase request (e.g., billing transaction), reversal transaction, e-script transaction, benefits determination request)
Prescriber of the Product Information
Prescriber ID or other identifier (e.g. prescriber code)
Prescriber Name (e.g. Last Name, First Name)
Prescriber Contact Information (e.g. Telephone Number)
Merchant Information
Merchant Information (e.g. store name, store address, chain identifier, etc.)
Merchant ID (e.g. merchant code)
Product Information
Product information—Product or service identifier (e.g. product code, UPC code, NDC code, etc.), product or service name, etc.
Purchase Reference Number
Quantity of Product to be Dispensed
Days' Supply of the Product Purchased
Pricing information for the product or service (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
Number of Refills Authorized
Fill Number (i.e., the current refill number for the current request)
Transaction Submission Date of the Request (the original date that the Request was electronically submitted to the request processor 16.

Upon receipt of the request, the request processor 16 processes the request and returns the response to the request in the form of an electronic message. The type of processing performed by the request processor is dependent upon the application in which the computing device 20, method and computer program product are employed. In an example embodiment in which the request is an electronic health care message, such as a prescription claim request, a medical claim request, a predetermination of benefits request or the like, the request processor may be owned, operated or otherwise associated with an insurance company or other payor or provider of health care benefits and, as such, may be configured to process the electronic health care message to determine, for example, the cost of a product or service, such as a prescribed medication, to a patient once the patient's health care benefits have been taken into account.

In an example embodiment, the request may be in the form of a predetermination of benefits request for a prescription that a patient is attempting to fill at a pharmacy and for which the patient has presented a prescription discount card to the pharmacist. The pharmacist may then interact with a pharmacy management system in order to transmit a predetermination of benefits request to a request processor configured to support the prescription discount program associated with or represented by the prescription discount card and to provide information to the pharmacy management system regarding the cost of the prescription to the patient once any discount provided by the prescription discount program has been taken into account.

Prescription discount cards are increasingly available to patients. Prescription discount cards may be obtained in various manners including by being downloaded by a patient, available to the patient in the office of a physician or other health care professional or mailed to the patient. The vendors of prescription discount cards generate revenue by charging an administration fee which is added to the patient's prescription price and subsequently paid to the vendor of the prescription discount card by the pharmacy. The sum of the patient's prescription price and the administration fee may be less than the cost of the prescription in the absence of the benefits provided by the prescription discount program such that the patient saves money even after taking into account the administration fee. For example, the usual and customary charge for a prescription by a pharmacy may be $72.66. Pursuant to the agreement between the pharmacy and the vendor of a prescription discount card, the discount provided by the patient's use of the prescription discount card is 70%, such that the usual and customary charge is reduced by 70% resulting in a cost to the patient utilizing the prescription discount card of $21.80 for the prescription. In this example, the administration fee charged by the vendor of the prescription discount card is $6.00. This administration fee is paid from the prescription cost borne by the patient. Thus, of the $21.80 paid by the patient, the vendor of the prescription discount card receives the $6.00 administration fee from the pharmacy and the pharmacy retains the remainder, that is, $15.80. As exemplified by the foregoing example in which the request from the source is a predetermination of benefits request related to a prescription discount card presented by a patient, the request processor 16 may be configured to determine the benefits conferred by the use of a prescription discount card, and, as such, may provide a response in the form of an electronic message to such a request indicating the cost of a product, such as a medication, or service to the patient pursuant to their use of the prescription discount card.

As such, the computing device 20 includes means, such as the processing circuitry 22, the processor 24, the communication interface 28 or the like, for receiving an electronic message generated by the request processor 16 responsive to the request. See block 44 of FIG. 3 as well as electronic message designated as the second signal in the signal flow diagram of FIG. 4. As shown in block 46 of FIG. 3, the computing device includes means, such as a processing circuitry, the processor or the like, for parsing the electronic message to separately identify fields of the electronic message providing different types of information. In accordance with the foregoing example relating to the use of prescription discount cards, the computing device, such as a processing circuitry, is configured to parse the electronic message to identify the type of message and, more particularly, to identify that the electronic message is a response to a predetermination of benefits request relating to the patient's use of a prescription discount card. Additionally, the computing device, such as the processing circuitry, of this example embodiment may be configured to parse the electronic message to identify the cost of filling a prescription to the patient following application of the benefits afforded the patient using the prescription discount card.

In accordance with an example embodiment, the computing device 20 includes mean, such as the processing circuitry 22, the processor 24 or the like, for constructing a response to the electronic message that reverses the action indicated by the electronic message. See block 48 of FIG. 3. For example, in an instance in which the electronic message from the request processor 16 indicates that the electronic message is responsive to a predetermination of benefits request that was triggered by a patient's use of a prescription discount card, the computing device, such as processing circuitry, may be configured to construct a response indicating that the product, such as a medication, or service that was the subject of the predetermination of benefits request is not to be fulfilled at the cost indicated by the electronic message from the request processor, thereby reversing the action otherwise designed to be initiated by the electronic message. As shown in block 50 of FIG. 3, the computing device also include means, such as the processing circuitry, the processor, the communication interface 28 or the like, for causing the response to be transmitted to the request processor that provided the electronic message. See also the third signal designated Response with Reversal from the signal flow diagram of FIG. 4. In an example embodiment, the computing device, such as the processing circuitry, is configured to automatically construct the response to the electronic message that reverses the action indicated by the electronic message and to automatically cause the communication interface to transmit the response to the electronic message to the request processor without input from the source.

As shown in block 52 of FIG. 3, the computing device 20 also includes means, such as the processing circuitry 22, the processor 24 or the like, for determining an alternative action based upon the action indicated by the electronic message. In accordance of an example embodiment, an alternative prescription discount program may be available and may be supported by a contractual agreement with one or more pharmacies. The alternative prescription discount program may provide a predefined cost to patients for one or more products, such as medications, or services. This predefined cost may be termed the first alternative cost. Additionally, the alternative prescription discount program may, in one embodiment, also define a second alternative cost for a product, such as a medication, or a service that is not predefined, at least not in terms of being a predefined numerical value, but is, instead, based upon the action indicated by the electronic message provided by the request processor 16, such as the cost for the product or service pursuant to the prescription discount program associated with the prescription discount card. For example, the second alternative cost may be a predefined amount or a predefined percentage less than the cost for the same product or service as indicated by the electronic message from the request processor pursuant to the prescription discount program associated with the prescription discount card utilized by the patient. Thus, provision of the product, such as the medication, or service that was the subject of the original predetermination of benefits request, at the alternative cost, such as either the first or second alternative cost, may serve as the alternative action determined by the computing device.

Once the alternative action has been determined, such as by determining an alternative cost for the product, such as a medication, or service pursuant to the alternative prescription discount program, the computing device 20 includes means, such as the processing circuitry 22, the processor 24 or the like, for constructing an alternative message that provides the alternative action. See block 54 of FIG. 3. In this regard, the alternative message that is constructed in accordance with the foregoing example includes: (i) the alternative cost for the same product, such as medication, or service that was a subject of the original predetermination of benefits request, (ii) an indication that the product or service is available at the alternative cost pursuant to the alternative prescription discount program, (iii) an indication of the alternative discount program, and (iv) an indication that the alternative cost is less than the cost for the same product, such as medication, or service, pursuant to the prescription discount program associated with the prescription discount card presented by the patient. The computing device of this example also includes means, such as the processing circuitry, the processor, the communication interface 28 or the like, for causing the alternative message to be transmitted to the source 12 of the original request. See block 56 of FIG. 3 and the fourth signal designated the Alternative message with alternative action from the signal flow diagram of FIG. 4.

Referring now to FIG. 5, a flow chart is provided that illustrates the operations performed in accordance with an example embodiment for determining an alternative action and thereafter constructing an alternative message providing the alternative action. In this example embodiment, the computing device 20 includes means, such as the processing circuitry 22, the processor 24 or the like, for identifying the cost of the product or service that was the subject of the initial request based upon a review of the electronic message provided by the request processor 16. See block 70 of FIG. 5. As described above, the computing device, such as the processing circuitry, may be configured to parse the electronic message and to identify the cost of the product or service from a respective field of the electronic message that relates to the cost.

As shown in block 72 of FIG. 5, the computing device 20 also includes means, such as the processing circuitry 22, the processor 24 or the like, for determining a first alternative cost for the product or service. In the example described above, the first alternative cost may be the predefined cost for products or services that has been negotiated with one or more pharmacies by the alternative prescription discount program. Thus, a schedule or other listing of the predefined cost for the various products and services pursuant to the alternative prescription discount program may be stored by the database 30 or may otherwise be accessible to the computing device. As show in decision block 74 of FIG. 5, the computing device of the example embodiment includes means, such as the processing circuitry, the processor or the like, for determining whether the first alternative cost is less than the cost identified by the electronic message, such as the cost pursuant to the prescription discount program associated with the prescription discount card. In an instance in which the first alternative cost is less than the cost provided by the prescription discount program associated with the prescription discount card, the computing device includes means, such as the processing circuitry, the processor or the like, for constructing the alternative message so as to reference the first alternative cost for the product or service as well as to indicate that the first alternative cost is available pursuant to the alternative prescription discount program and is less than the cost for the same product or service pursuant to the prescription discount program associated with the prescription discount card. See block 76 of FIG. 5. As described above in conjunction with block 56 of FIG. 3, the computing device of this example also includes means, such as the processing circuitry, the processor, the communication interface 28 or the like, for causing the alternative message including an indication of the first alternative cost to be transmitted to the source 12 of the original request.

Alternatively, in an instance in which the first alternative cost is not less than the cost identified by the electronic message pursuant to the prescription discount program associated with the prescription discount card, the computing device 20 of this example embodiment includes means, such as the processing circuitry 22, the processor 24 or the like, for determining a second alternative cost for the product or service. See block 78 of FIG. 5. The second alternative cost is determined based on the cost from the electronic message, such as the cost of the same product or service pursuant to the prescription discount program associated with the prescription discount card. For example, the second alternative cost may be defined pursuant to the alternative prescription discount program to be a predetermined amount or a predetermined percentage less than the cost for the same product of service pursuant to the prescription discount program associated with the prescription discount card. In one example, the second alternative cost may be 10% less than the cost for the same product or service pursuant to the prescription discount program associated with the prescription discount card.

In this instance, the computing device 20 also includes means, such as the processing circuitry 22, the processor 24 or the like, for constructing the alternative message so as to reference the second alternative cost for the product or service and to indicate the availability of the second alternative cost pursuant to the alternative prescription discount program along with an indication that the second alternative cost is less than the cost for the same product or service available pursuant to the prescription discount program associated with the prescription discount card. See block 80 of FIG. 5. As described above in conjunction with block 56 of FIG. 3, the computing device of this example also includes means, such as the processing circuitry, the processor, the communication interface 28 or the like, for causing the alternative message including an indication of the first alternative cost to be transmitted to the source 12 of the original request.

In response to the transmission of the alternative message to the source 12, the computing device 20, includes means, such as the processing circuitry 22, the processor 24, the communication interface 28 or the like, for receiving a subsequent request from the source. See block 58 of FIG. 3 as well as the fifth signal in the signal flow diagram of FIG. 4. In accordance with the foregoing example, the pharmacist, upon receipt of the alternative message, may inform the patient as to the lower cost of the product or service pursuant to the alternative prescription discount program. In some instances, the patient may elect to continue to utilize their prescription discount card and to pay the higher cost for the product or service then the cost available pursuant to the alternative prescription discount program. In other instances, however, the patient may avail themselves of the lower cost for the product or service available pursuant to the alternative prescription discount program. In this situation, the patient may already be a member of the alternative prescription discount program, but, if not, the patient become a member, such as by downloading an application ("app") or otherwise registering with the alternative prescription discount program prior to presenting the pharmacist with their membership credentials for the alternative prescription discount program.

In the example embodiment depicted in FIG. 3, the computing device 20 includes means, such as the processing circuitry 22, the processor 24 or the like, for determining whether the original request and the subsequent request correspond, such as by being identical (other than the time associated with the respective requests). See block 60. For example, the computing device, such as the processing circuitry, may be configured to compare the subsequent request to the original request that is stored by the at least one database 30 and that generated the electronic message from the request processor 16 that has since been reversed. In an instance in which the initial request and the subsequent request correspond, the computing device includes means, such as the processing circuitry, the processor, the communication interface 28 or the like, for causing the subsequent request to be transmitted to the request processor, such as the same request processor that processing the original request since the subsequent predetermination of benefits request is also based upon the patient's use of the prescription discount program associated with the prescription discount card since the subsequent request and the original request correspond, such as by being identical. See block 62 of FIG. 3 and the signal designated 6a(1) in the signal flow diagram of FIG. 4.

The request processor 16 then processes the subsequent request and transmits a second electronic message in response thereto. Since the original request and the subsequent request correspond, the second electronic message may also correspond, such as by being identical, to the prior electronic request provided by the request processor in response to the original request. Among other information, the second electronic request may include the cost to the patient for fulfillment of the product or service pursuant to the prescription discount program associated with the prescription discount card. As such, the computing device 20 of this example embodiment includes means, such as the processing circuitry 22, the processor 24, the communication interface 28 or the like, for receiving the second electronic message from the request processor and for causing the second electronic message to be transmitted to the source 12 without reversal of the action indicated by the second electronic message, that is, authorization of the fulfillment of the prescription at the cost indicated in the second electronic message. See block 64 of FIG. 3 as well as the signal designated 6a(2) in the signal flow diagram of FIG. 4. In this regard, the computing device, such as the processing circuitry, is configured to determine that the second electronic message received from the request processor is responsive to the subsequent request from the source that corresponds, such as by being identical, to the initial request. By determining the correspondence, e.g., identicality, of the initial request and the subsequent request as described above in conjunction with decision block 60 of FIG. 3, the computing device, such as the processing circuitry, is configured to determine that the second electronic message from the request processor is not to be reversed in the same manner as the prior electronic message that was responsive to the initial request and to, instead, forward the second electronic message to the source. This determination that the second electronic message is not to be reversed is the result of a recognition that the electronic message responsive to the initial request has already been reversed and that the patient must not be interested in the alternative action proposed by the service provider 14 since the source has repeated their reliance upon the prescription discount program associated with the prescription discount card in the form of the subsequent request such that and no further reversal is appropriate.

Alternatively, in an instance in which the request and the subsequent request are determined as described above in conjunction with block 60 of FIG. 3 to be different with the subsequent request indicating that the alternative action be taken, such as by presenting a predetermination of benefits request pursuant to the alternative prescription discount program, the computing device 20 includes means, such as processing circuitry 22, the processor 24, or the like, for processing the subsequent request that indicates that the alternative action be taken in a different manner than the manner in which the request that generated the electronic message was processed. See block 66 of FIG. 3 as well as the processing indicated at 6b(1) of FIG. 4. In regards to the processing of the subsequent request, the computing device, such as the processing circuitry, the processor, the database 30 or the like, may be configured to identify the alternative cost for the product or service that was previously determined. In the example embodiment of FIG. 5, the alternative cost may be the first alternative cost in an instance in which the first alternative cost is less than the cost for the same product or service pursuant to the prescription discount program associated with the prescription discount card or the second alternative cost in an instance in which the first alternative cost is not less than cost pursuant to the prescription discount program associated with the prescription discount card. Alternatively, the computing device, such as the processing circuitry, the processor, the communication interface 28 or the like, may be configured to direct the subsequent request to a request processor. The request processor to which the subsequent request is directed by be either the same request processor 16 in an instance in which the same request processor is configured to process predetermination of benefit requests both for the prescription discount program associated with the prescription discount card and the alternative prescription discount program, or a different request processor that is configured to process and respond to predetermination benefit request related to the alternative prescription discount program.

In either instance and as shown by the signal designated 6b(2) in the signal flow diagram of FIG. 4, the computing device 20, such as a processing circuitry 22, the processor 24, the communication interface 28 or the like, is configured to cause a response to the subsequent request to be provided to the source. In the foregoing example, this response to the subsequent request includes the alternative cost for the product, such as medication, or service that was the subject of the predetermination benefits request.

Upon receipt of the response to the subsequent request and in an instance in which the patient elected to utilize the alternative prescription discount program, the patient may purchase the product, such as medication, or service at the alternative cost, thereby saving the patient money in comparison to the cost otherwise paid by the patient as a result to their use of the prescription discount card. The pharmacy then remits to the alternative prescription discount program a fee, such as a predefined fee associated with the use of the alternative prescription discount program in conjunction with the fulfillment of a prescription. The pharmacy retains the remainder of the price paid by the patient. By defining the fee so as to be less than the administration fee charged by the vendors of prescription drug cards, the pharmacy may also retain more money in an instance in which the alternative prescription discount program is utilized then in an instance in which a prescription discount card is utilized.

As described above, the computing device 20, method and computer program product increase the efficiency with which messages are exchanged, thereby conserving network and processing resources associated with the exchange of messages. In this regard, the computing device, method and computer program product are configured to automatically reverse an action indicated by an electronic message. By automatically reversing an action, the number of messages that are constructed, transmitted and received may be reduced relative to an instance in which a message must first returned to the source 12 which then issues a reversal message.

As noted above, FIGS. 3 and 5 are flowcharts illustrating the operations performed by a method, apparatus and computer program product, such as computing device 20 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of a computing device employing an embodiment of the present invention and executed by processing circuitry 22, e.g., a processor 24, of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3-5, when executed, convert a computer or processing circuitry into a particular machine configured to perform an example embodiment of the present invention. Accordingly, the operations of FIGS. 3 and 5 define an algorithm for configuring a computer or processing circuitry, e.g., processor, to perform an example embodiment. In some cases, a general purpose computer may be provided with an instance of the processor which performs the algorithms of FIGS. 3 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to automatically reverse an action indicated by an electronic message, the computing device comprising:
a communication interface configured to receive and transmit electronic messages;
processing circuitry configured to:
for a respective electronic message, parse the electronic message to separately identify a plurality of fields of the electronic message providing different types of information;
construct a response to the electronic message that reverses the action indicated by the electronic message;
construct an alternative message that provides an alternative action to the action indicated by the electronic message; and
in an instance in which a subsequent request indicating that the alternative action be taken is received, process the subsequent request in a different manner than a request that generated the electronic message,
wherein the communication interface is configured to receive the electronic message, to transmit the response to the electronic message to a request processor that provided the electronic message, to transmit the alternative message to a source and to receive the subsequent request from the source.

2. A computing device according to claim 1 wherein the communication interface is further configured to receive the request that generated the electronic message, and wherein the computing device further comprises at least one database configured to store the request.

3. A computing device according to claim 2 wherein the processing circuitry is further configured to compare the subsequent request to the request stored by the at least one database that generated the electronic message in order to determine whether the request and the subsequent request correspond.

4. A computing device according to claim 3 wherein, in an instance in which the request and the subsequent request are determined to correspond, the processing circuitry is configured to cause the subsequent request to be directed to the request processor and to cause a second electronic message received from the request processor in response to the subsequent request to be provided to the source without reversal of the action indicated by the second electronic message.

5. A computing device according to claim 1 wherein the processing circuitry is further configured to determine the alternative action based upon the action indicated by the electronic message.

6. A computing device according to claim 5 wherein the processing circuitry is configured to parse the electronic message to identify the field that indicates a cost of a product or service, and wherein the processing circuitry is further configured to determine the alternative action by determining an alternative cost of the product or service based upon the cost of the product or service identified by the electronic message.

7. A computing device according to claim 1 wherein the processing circuitry is configured to automatically construct the response to the electronic message that reverses the action indicated by the electronic message and to automatically cause the communication interface to transmit the response to the electronic message to the request processor without input from the source.

8. A method for automatically reversing an action indicated by an electronic message, the method comprising:
receiving a plurality of electronic messages;
for a respective electronic message, parsing the electronic message to separately identify a plurality of fields of the electronic message providing different types of information;
constructing a response to the electronic message that reverses the action indicated by the electronic message;
transmitting the response to the electronic message to a request processor that provided the electronic message;
constructing an alternative message that provides an alternative action to the action indicated by the electronic message;
transmitting the alternative message to a source;
in response to transmission of the alternative message, receiving a subsequent request from the source; and
in an instance in which the subsequent request indicates that the alternative action be taken, processing the subsequent request in a different manner than a request that generated the electronic message.

9. A method according to claim 8 further comprising receiving the request that generated the electronic message and storing the request in at least one database.

10. A method according to claim 9 further comprising comparing the subsequent request to the request stored by the at least one database that generated the electronic message in order to determine whether the request and the subsequent request correspond.

11. A method according to claim 10 wherein, in an instance in which the request and the subsequent request are determined to correspond, the method further comprises transmitting the subsequent request to the request processor and transmitting a second electronic message received from the request processor in response to the subsequent request to the source without reversal of the action indicated by the second electronic message.

12. A method according to claim 8 further comprising determining the alternative action based upon the action indicated by the electronic message.

13. A method according to claim 12 wherein parsing the electronic message comprises parsing the electronic message to identify the field that indicates a cost of a product or service, and wherein the method further comprises determining the alternative action by determining an alternative cost of the product or service based upon the cost of the product or service identified by the electronic message.

14. A method according to claim 8 wherein the response to the electronic message that reverses the action indicated by the electronic message is automatically constructed and the response to the electronic message is automatically transmitted to the request processor without input from the source.

15. A computer program product for automatically reversing an action indicated by an electronic message, the computer program product comprising a non-transitory computer readable medium having program code stored thereon, the program code comprising program code instructions configured, upon execution, to:
receive a plurality of electronic messages;
for a respective electronic message, parse the electronic message to separately identify a plurality of fields of the electronic message providing different types of information;
construct a response to the electronic message that reverses the action indicated by the electronic message;

cause the response to the electronic message to be transmitted to a request processor that provided the electronic message;
construct an alternative message that provides an alternative action to the action indicated by the electronic message;
cause the alternative message to be transmitted to a source;
in response to transmission of the alternative message, receive a subsequent request from the source; and
in an instance in which the subsequent request indicates that the alternative action be taken, process the subsequent request in a different manner than a request that generated the electronic message.

16. A computer program product according to claim 15 wherein the program code further comprises program code instructions configured to receive the request that generated the electronic message and to cause the request to be stored in at least one database.

17. A computer program product according to claim 16 wherein the program code further comprise program code instructions configured to compare the subsequent request to the request stored by the at least one database that generated the electronic message in order to determine whether the request and the subsequent request correspond.

18. A computer program product according to claim 17 wherein, in an instance in which the request and the subsequent request are determined to correspond, the program code further comprises program code instructions configured to cause the subsequent request to be transmitted to the request processor and to cause a second electronic message received from the request processor in response to the subsequent request to be provided to the source without reversal of the action indicated by the second electronic message.

19. A computer program product according to claim 15 wherein the program code further comprises program code instructions configured to determine the alternative action based upon the action indicated by the electronic message.

20. A computer program product according to claim 19 wherein the program code instructions configured to parse the electronic message comprise program code instructions configured to parse the electronic message to identify the field that indicates a cost of a product or service, and wherein the program code further comprises program code instructions configured to determine the alternative action by determining an alternative cost of the product or service based upon the cost of the product or service identified by the electronic message.

* * * * *